J. H. KELLY.
Locomotive Lamp Case.
No. 13,577.
Patented Sept. 18, 1855.
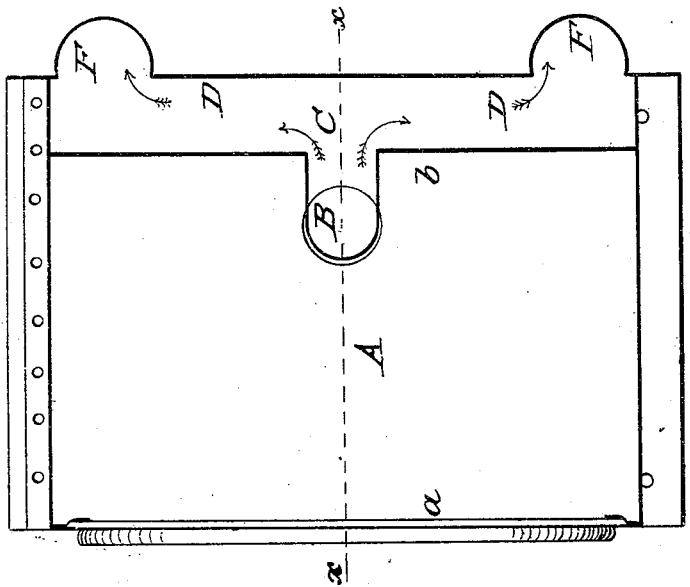
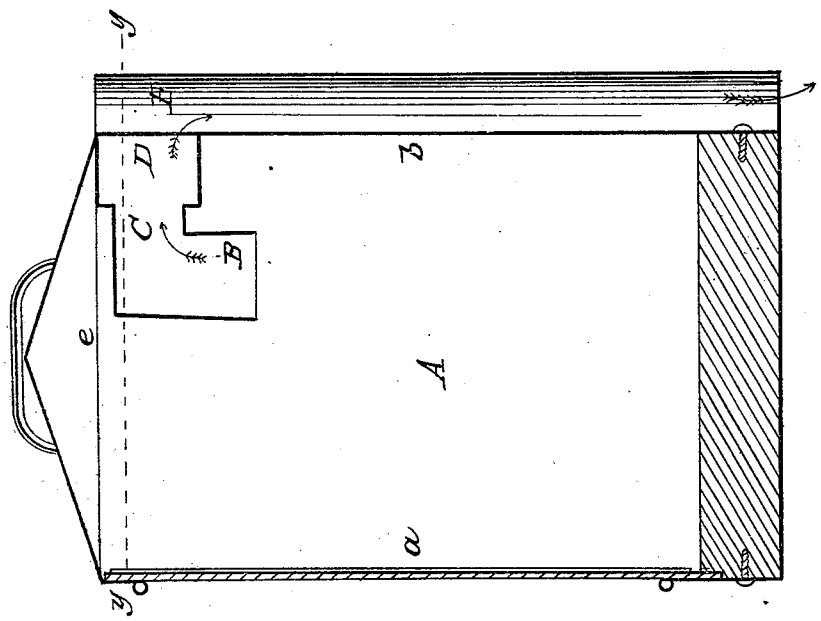

UNITED STATES PATENT OFFICE.

JAS. H. KELLY, OF ROCHESTER, NEW YORK.

LANTERN FOR LOCOMOTIVES.

Specification of Letters Patent No. 13,577, dated September 18, 1855.

*To all whom it may concern:*

Be it known that I, JAMES H. KELLY, of Rochester, in the county of Monroe and State of New York, have invented a new and useful Improvement in Locomotive-Lamps; and I do hereby declare that the following is a full, clear, and exact description of the construction and operation of same, reference being had to the annexed drawing, forming part of this specification, in which—

Figure 1 is a vertical section of the lamp case on line $x$ $x$ Fig. 2. Fig. 2 is a horizontal section of the same on line $y$ $y$ of Fig. 1.

Similar characters of reference denote the same part.

The object of my invention is to render the downward current produced by the smoke stack effective in promoting the burning of the lamp; and at the same time prevent entirely an inward draft to the burner.

The invention consists in connecting the chamber which receives the smoke from the burner, with one or more downward flues, open at bottom, so that the downward current over the lamp case, produced by the bell shape of the smoke stack, will cause a steady downward draft through said flues; removing the smoke and promoting the burning of the lamp.

In the drawing A is the lamp case; $a$ being the front, $b$ the back, and $c$ the top.

B is the ordinary flue directly over the burner, into which the flame and smoke first passes, connected with which by a flue C is a smoke chamber D. This chamber opens into one or more vertical flues F, closed at top and open at bottom: the position and number of these flues not being definitely restricted.

The downward current over the exterior of the case during the running of the engine, influences downward drafts in the flues F producing the currents indicated by the arrows in the drawing. The inward draft which always to some extent takes place from this downward current, is by this construction entirely obviated; thus adding steadiness, to the brilliancy of flame produced by the superior draft of the downward flues.

What I claim as new and of my own invention and desire to secure by Letters Patent, is—

I disclaim the arrangement of lateral flues as applied in the lamp case of Salmon Bidwell, also the arrangement of flues as used in the patent of I. A. Williams; my invention being an improvement on both of these.

What I do claim is—

The construction of locomotive lamp cases, with vertical descending flues, open at bottom only, constructed substantially as set forth for the purposes specified.

In testimony whereof, I have hereunto signed my name before two subscribing witnesses.

JAMES H. KELLY.

Witnesses:
ELIJAH JORDAN,
PHILIP L. BOX.